United States Patent
Colin et al.

(10) Patent No.: US 8,374,764 B2
(45) Date of Patent: Feb. 12, 2013

(54) BRAKING SYSTEM ARCHITECTURE FOR AN AIRCRAFT FITTED WITH ELECTROMECHANICAL BRAKES

(75) Inventors: Emmanuel Colin, Paris (FR); Julien Thibault, Gif sur Yvette (FR); Pierre Girod, Saint-Cloud (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 50 days.

(21) Appl. No.: 12/795,304

(22) Filed: Jun. 7, 2010

(65) Prior Publication Data
US 2010/0332095 A1 Dec. 30, 2010

(30) Foreign Application Priority Data
Jun. 9, 2009 (FR) ...................................... 09 02779

(51) Int. Cl.
*G06F 19/00* (2011.01)
(52) U.S. Cl. ............................................. 701/70; 701/3
(58) Field of Classification Search ................ 701/3, 48, 701/70–71
See application file for complete search history.

(56) References Cited

U.S. PATENT DOCUMENTS

| 6,671,588 B2 * | 12/2003 | Otake et al. ...................... 701/3 |
| 2001/0045771 A1 | 11/2001 | Corio et al. |
| 2003/0125848 A1 * | 7/2003 | Otake et al. ...................... 701/3 |
| 2004/0238299 A1 | 12/2004 | Ralea et al. |
| 2006/0226698 A1 * | 10/2006 | Riebe et al. ..................... 303/20 |
| 2007/0007088 A1 * | 1/2007 | Miller et al. ............. 188/1.11 L |
| 2010/0125380 A1 * | 5/2010 | Brueckner et al. ................ 701/3 |
| 2010/0280725 A1 * | 11/2010 | Cahill ............................. 701/70 |

FOREIGN PATENT DOCUMENTS
EP 1886887 A1 2/2008

* cited by examiner

*Primary Examiner* — Hussein A. Elchanti
(74) *Attorney, Agent, or Firm* — Sughrue Mion, PLLC

(57) ABSTRACT

The invention relates to a braking system architecture for an aircraft fitted with electromechanical brakes including at least one electromechanical actuator. In accordance with the invention, the architecture comprises at least one proximity unit disposed in the proximity of the brakes at the bottom of the undercarriage and including input/output means for collecting and calibrating at least signals coming from sensors associated with the brakes, and for transmitting the signals as processed in this way to control members for controlling the actuators by means of a communications bus running along the undercarriage, the proximity unit further including control means for controlling the blocking members of the actuators.

2 Claims, 1 Drawing Sheet

BRAKING SYSTEM ARCHITECTURE FOR AN AIRCRAFT FITTED WITH ELECTROMECHANICAL BRAKES

The invention relates to a braking system architecture for an aircraft fitted with electromechanical brakes.

TECHNOLOGICAL BACKGROUND OF THE INVENTION

In known architectures, braking electromechanical actuators are installed at the wheels of the aircraft, and they receive their power from controllers that are generally situated in a bay close to the undercarriages carrying the wheels. The controllers receive orders from one or more braking computers installed in an avionics bay, generally located towards the nose of the aircraft, close to the cockpit.

Positioning the braking controllers and computers in bays enables these elements to be placed in an environment that is favorable and less exposed, thereby contributing to increasing their reliability. Nevertheless, this positioning requires long cables to be used, in particular cables that are grouped together in a harness extending between the actuators and the controllers and running along the undercarriages. Such cables present weight that is not negligible.

OBJECT OF THE INVENTION

An object of the invention is to propose a novel braking system architecture using electromechanical actuators, which architecture enables acceptable reliability to be maintained while reducing overall weight.

BRIEF SUMMARY OF THE INVENTION

In order to achieve this object, there is provided a braking system architecture for an aircraft fitted with electromechanical brakes including at least one electromechanical actuator, the architecture comprising at least one proximity unit disposed in the proximity of the brakes at the bottom of the undercarriage and including input/output means for collecting and calibrating at least signals coming from sensors associated with the brakes, the proximity unit further including means for controlling members for blocking the actuators in position, the proximity unit being connected to brake control members disposed in the aircraft by means of a communications bus.

Amongst the cables running down along the undercarriages, some are low voltage cables for transmitting signals coming from sensors (two cables per sensor). Others are used for powering members that require only low power, such as the members for blocking the actuators and that serve to block their pushers in position in order to provide a parking brake.

The invention thus proposes reducing the length of these cables by limiting their extent within a low zone of the undercarriage, running from the sensors and the blocking members to the proximity unit, which unit is connected to the remainder of the architecture by a communications bus running along the undercarriage, and considerably lighter than the multitude of low power cables that it replaces.

The zone in which the proximity unit is positioned is indeed more exposed than the undercarriage bays, or the avionics bay, nevertheless, the functions located in a proximity unit are low level functions such as calibrating signals and managing the parking function, which functions can be provided by elementary logic, where appropriate implemented in hardware, so that it can be ensured without compromising the reliability of the system.

Thus, the provisions of the invention enable substantial weight savings to be achieved, without impacting the reliability of the braking system.

BRIEF DESCRIPTION OF THE FIGURES

The invention can be better understood in the light of the following description of a particular embodiment of the invention given with reference to the accompanying figures, in which.

DETAILED DESCRIPTION OF THE INVENTION

Figure 1:
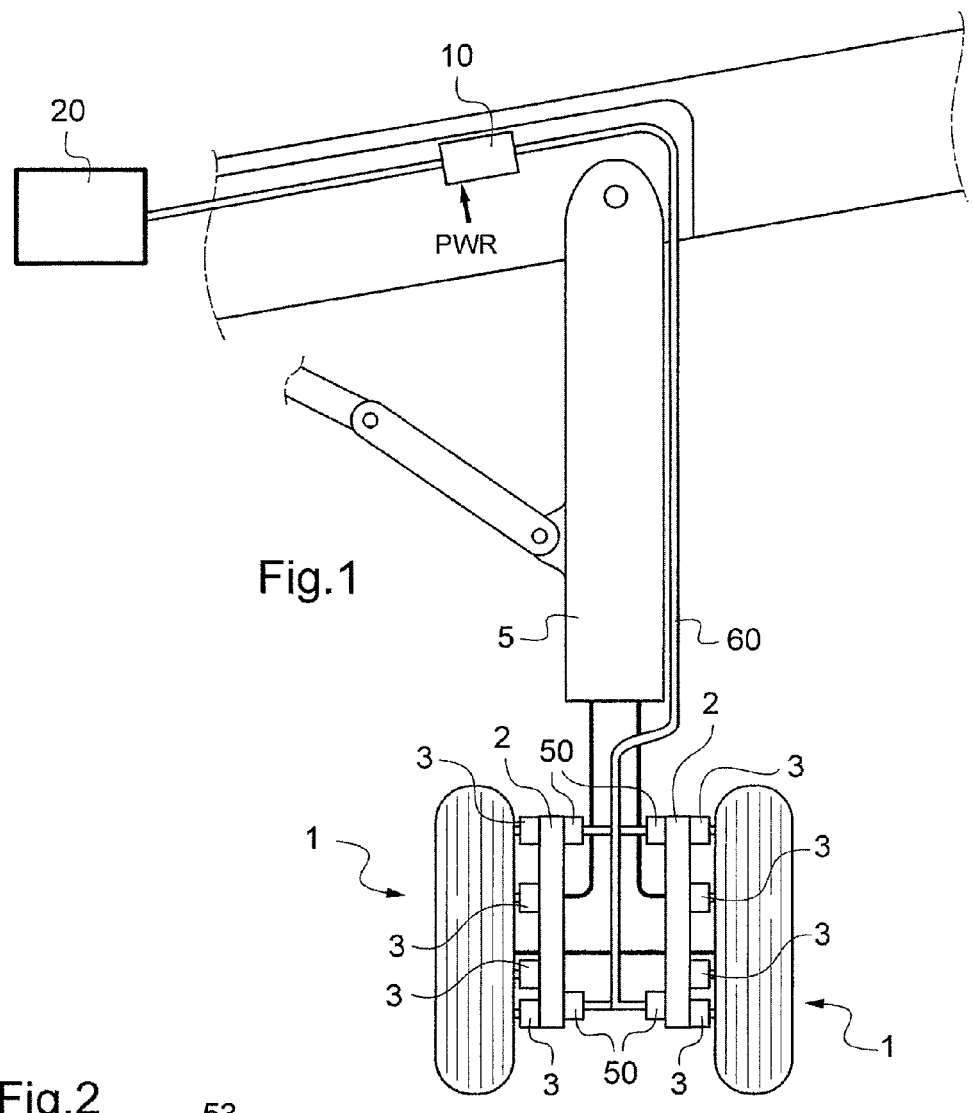
FIG. 1 is a diagrammatic view of an aircraft undercarriage carrying wheels that are braked by electric brakes, and showing the general positioning of the braking system of the invention.

FIG. 1 shows a braking system in a first embodiment of the invention, comprising a certain number of brake wheels 1 fitted with brakes 2 having electromechanical actuators 3. The wheels are carried at the bottom of an undercarriage 5.

The electromechanical actuators in this example are fitted with electric motors for selectively moving a pusher in order to apply a braking force on disks. The motors are powered by one or more controllers 10 (known as electromechanical actuator controllers or EMACs), essentially comprising an inverter serving to deliver electrical power in compliance with braking setpoints generated by a braking computer 20. For this purpose, the controllers 10 are connected to high power networks and they deliver this power to the actuators 3 by means of high power cables going down along the undercarriages. Each controller 10 is connected to an actuator 3 by means of three power cables delivering respective phases to the motor, and given overall reference 11 in FIG. 2. The high power transport cables are not shown in FIG. 1, for reasons of greater clarity.

The controllers 10 in this example are located in the bay for the undercarriage 5 (i.e. in the bay into which the undercarriage is retracted in flight), while the braking computer 20 is located in the avionics bay of the aircraft. The braking computer 20 is connected to the controller 10 by the communications bus of the aircraft.

Figure 2:
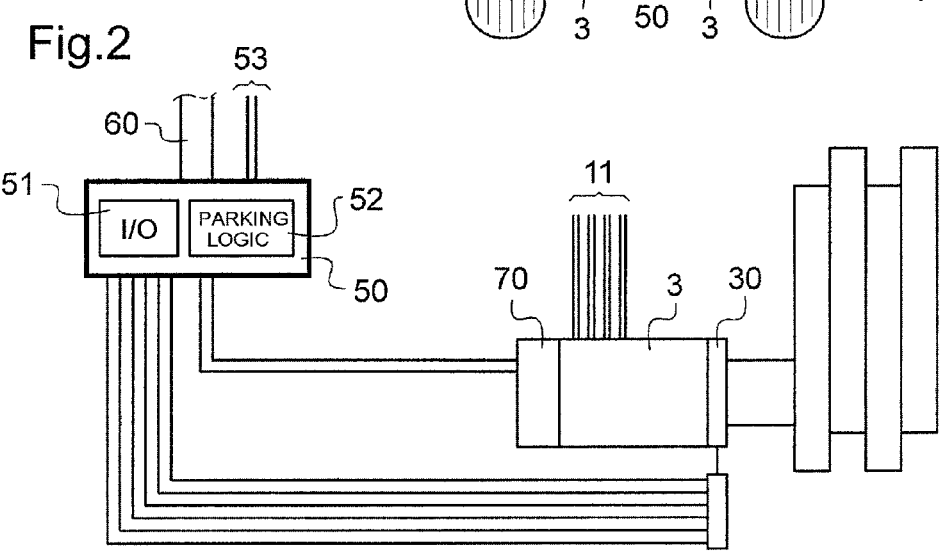
FIG. 2 is a diagrammatic view of a connection between a proximity unit and one of the electromechanical actuators.

There are also other elements on the brake or the wheel that need to be connected to the controller 10. These comprise essentially various sensors needed for operating the actuators. Mention may be made in particular of resolvers 30 fitted to each of the actuators to measure the angular position of the motor of the actuator, and as shown in FIG. 2, each resolver may require as many six cables.

In known architectures, each of these sensors is normally connected to the controllers 10 by means of low voltage cables, using at least two cables per sensor, and naturally running along the undercarriages.

The invention proposes placing at least one proximity unit 50 in the proximity of the brakes, in the bottom portion of the undercarriage, the proximity unit being provided with input/output means 51 for collecting the signals from the various above-mentioned sensors, shaping them, and converting them into digital signals suitable for being sent over a communications bus 60 extending between the proximity unit 50 and the controller 10 in the bay.

The communications bus 60 is preferably selected so as to be particularly robust, since it extends in an exposed environment along the undercarriage.

Thus, the low voltage cables now extend solely between the sensors and the proximity unit 50 that is located in the immediate vicinity of the sensors, thereby considerably reducing the length thereof. All that needs to run along the length of the undercarriage is now a single communications bus that in practice requires only two cables.

Other elements also need to be connected to the controller 10. These comprise blocking members 70 fitted to each of the actuators to block the pusher in position, in particular for performing a parking brake function. Each of the parking members is normally connected to the corresponding controller 10 via two low voltage cables that serve to carry the power needed to actuate the blocking member.

In the invention, the proximity unit 50 is fitted with control logic 52 for controlling the parking members, which are thus connected to the units. It should be observed that the control logic for the members is very simple and, in response to an actuation order, it consists in sending a pulse to the blocking member 70 if it is of the bistable type, or in disconnecting its power supply if the blocking member 70 is the fail-safe type. Such logic control may be implemented in hardware, or in software using a basic microcontroller, and thus by using means that are very simple and suitable for operating reliably in an environment that a priori is less favorable than in a bay.

The order for actuating the blocking member 70 is preferably sent from the controller 10 over the communications bus 60 so as to eliminate a large number of low voltage cables, at least on the path extending between the controller and the proximity unit.

Thus, positioning the control logic 52 for the control members directly in the proximity unit 50 serves to eliminate even more low voltage cables.

To be complete, it should be mentioned that the proximity unit 50 must itself be given a low voltage power supply, which is provided by means of two low voltage cables 53 going down along the undercarriage.

The number of proximity units 50 may vary depending on circumstances. For a brake having four actuators, it is preferable to provide two proximity units, each of them being connected to the sensors and the blocking members of two of the actuators. The proximity units 50 are then advantageously located directly on the corresponding brake, as shown in FIG. 1, so as to minimize the length of the cables extending from the sensors and the blocking members to said units.

In this configuration, it is easy to quantify the improvement provided by the provisions of the invention. Assuming that each brake has four actuators, with known architectures it is necessary to have eight cables per actuator (six for the resolver and two for the blocking member), giving a total of thirty-two low voltage cables running along the undercarriage for each of the brakes.

With the provisions of the invention, there is only one communications bus (two cables) and the power supply for the proximity units, i.e. four cables. This gives a total of six low voltage cables per brake, thus constituting a significant saving.

It is necessary to ensure that the parking devices are powered. This power supply may be provided either by a dedicated power supply connected to the corresponding proximity unit (two additional wires per unit), or by taking advantage of the power supply used for powering the electronics cards contained in the proximity unit.

Naturally, the number of high voltage cables powering the motors of the actuators remains unmodified by the provisions of the invention.

In this respect, it is advantageous to use the proximity units 50 as junction units that receive the high voltage power supply for distributing to the motors of the actuators. In this configuration, each actuator is electrically connected to a single proximity unit, thus making it easier to disassemble and replace, should that be necessary.

The invention is not limited to the above description, but on the contrary covers any variant coming within the ambit defined by the claims. In particular, sensors may be connected to the proximity unit other than those that are directly attached to the brakes or the actuators. In particular, it is possible to connect tachometers to one or the other of the proximity units in order to measure the speed of rotation of each of the wheels, and also to connect the proximity or position sensors that are needed during the operation of extending/retracting undercarriages.

In a variant, if it is desired to achieve a high degree of segregation, the order for the blocking members may be transmitted by means of two cables that are separate from the communications bus. Nevertheless, the order may be common for all of the actuators connected to the proximity unit, such that these two cables alone suffice for controlling all of the blocking members concerned.

Naturally, all sorts of variants may be devised concerning the number of proximity units and the way in which they are associated with the actuators. In particular, a proximity unit may be associated with actuators belonging to distinct brakes, so as to provide a crossed configuration that guarantees that failure of one unit does not lead to a large number of actuators being lost for a given brake.

What is claimed is:

1. A braking system architecture for an aircraft having an undercarriage and being fitted with electromechanical brakes including at least one electromechanical actuator, wherein the architecture comprises:
    at least one proximity unit disposed in the proximity of the brakes at a bottom of the undercarriage,
    the proximity unit including input/output means for collecting and calibrating at least signals coming from sensors associated with the brakes, and for transmitting the signals as processed in this way to control members for controlling the actuators by means of a communications bus running along the undercarriage,
    the proximity unit further including control means for controlling the blocking members of the actuators and the proximity unit being disposed between the control means and an actuator.

2. A braking system architecture according to claim 1, wherein each brake has four actuators, two proximity units being carried by each of the brakes so that each of them is connected to two of the actuators of the brake.

* * * * *